United States Patent [19]

Morimoto et al.

[11] Patent Number: 5,867,716

[45] Date of Patent: Feb. 2, 1999

[54] DISTRIBUTED COMPUTER SYSTEM AND METHOD OF GENERATING AUTOMATIC OPERATION SCHEDULE FOR THE SAME

[75] Inventors: Narishige Morimoto, Kawasaki; Hitoshi Ueno, Zama; Masaaki Ohya, Yokohama; Toshiaki Arai, Sagamihara; Ken'ichi Soejima, Kawasaki, all of Japan

[73] Assignee: Hitachi, Ltd., Tokyo, Japan

[21] Appl. No.: 489,325

[22] Filed: Jun. 12, 1995

[30] Foreign Application Priority Data

Jun. 14, 1994 [JP] Japan ..................................... 6-131985

[51] Int. Cl.⁶ ....................................................... G06F 1/30
[52] U.S. Cl. ............................... 395/750.02; 395/750.06; 395/750.07; 395/651; 395/200.53
[58] Field of Search ........................ 395/931.41, 200.31, 395/200.32, 200.33, 200.38, 200.39, 200.4, 200.41, 200.52, 200.78, 675, 676

[56] References Cited

U.S. PATENT DOCUMENTS

| | | | |
|---|---|---|---|
| 3,999,050 | 12/1976 | Pitroda | 364/705.08 |
| 4,805,107 | 2/1989 | Kieckhafer et al. | 395/182.02 |
| 5,276,877 | 1/1994 | Friedrich et al. | 395/675 |
| 5,329,626 | 7/1994 | Klein et al. | 395/200.78 |
| 5,349,656 | 9/1994 | Kameko et al. | 395/672 |
| 5,717,934 | 2/1998 | Pitt et al. | 395/750.07 |

OTHER PUBLICATIONS

Krithi Ramamritham, "Allocation and Scheduling of Complex Periodic Tasks", pp. 108–115, 1990.

Hitachi Manual "A Guide to Operation for Integrate Automatic Operation Monitor 'Aomplus' Program for VOS 3", Sep. 1991. To the extent possible.

*Primary Examiner*—William M. Treat
*Assistant Examiner*—David M. Ovedovitz
*Attorney, Agent, or Firm*—Fay, Sharpe, Beall, Fagan, Minnich & McKee

[57] ABSTRACT

In a distributed computer system including a plurality of computers connected to each other via a communication path in which each computer executes processing by use of resources of the other, there is generated schedule information defining a schedule of transferring a status of each computer from one status to another status so as to achieve automatic operation of the computer according to the generated schedule information. One of the computers is used to gather, for each of the computers for which schedule information is to be generated, information of dependence including description of dependence to be held between the computer and other computers at the status transition. According to the collected information of dependence, there is created a dependent graph representing dependence between the computers for the whole system. Generated from the dependent graph is schedule information for each computer. The schedule information is distributed to the computer such that the status thereof is changed according to the distributed schedule information.

11 Claims, 16 Drawing Sheets

FIG. 5

| #HOST NAME | CONDITION TO START SYSTEM | CONDITION TO TERMINATE SYSTEM | MONTH | DAY | DAY OF WEEK |
|---|---|---|---|---|---|
| HOST0 | 3 | 3 | ★ | ★ | ★ |
| HOST1 | 5 | 5 | ★ | ★ | ★ |
| HOST2 | 5 | 10 | ★ | ★ | ★ |

401, 402, 403, 404, 405, 406; rows 452, 453, 454

FIG. 6

| #HOST NAME | CONDITION TO START SYSTEM | CONDITION TO TERMINATE SYSTEM | MONTH | DAY | DAY OF WEEK |
|---|---|---|---|---|---|
| HOST0 | IPL | INIT0 | ★ | ★ | ★ |
| HOST1 | BOOT | SHUTDOWN | ★ | ★ | ★ |
| HOST2 | IPL | POWEROFF | ★ | ★ | ★ |

501, 502, 503, 504, 505, 506; row 552

| # MONTH/DAY | DAY OF WEEK | START | END |
|---|---|---|---|
| * | MON-FRI | 08:00 | 23:00 |
| 12/30-1/5 | * | HOLIDAY | |
| 1/6 | * | 09:00 | * |
| 1/8 | * | * | 23:00 |
| 1/9 | * | 08:00 | 14:00 |
| 1/15,2/11,3/21 | * | HOLIDAY | |

301, 302, 303, 304 (column labels); 352, 353, 354, 355, 357, 358 (row labels)

FIG. 10

| # HOST NAME (901) | DESTINATION OF DEPENDENCE (902) | CONDITION TO START SYSTEM (903) | CONDITION TO TERMINATE SYSTEM (904) | MONTH (905) | DAY (906) | DAY OF WEEK (907) |
|---|---|---|---|---|---|---|
| HOST0 | HOST2 | 10 | 5 | ★ | ★ | ★ |
| HOST0 | HOST4 | 3 | 3 | ★ | ★ | ★ |
| HOST1 | HOST4 | 5 | 5 | ★ | ★ | ★ |
| HOST2 | HOST5 | 5 | 10 | ★ | ★ | ★ |
| .. | .. | .. | .. | .. | .. | .. |

(900)

952 — row 1
953 — row 2
954 — row 3
955 — row 4

DISTRIBUTED COMPUTER SYSTEM AND METHOD OF GENERATING AUTOMATIC OPERATION SCHEDULE FOR THE SAME

BACKGROUND OF THE INVENTION

The present invention relates to a distributed computer system including a plurality of computers linked with each other via a network such as a local area network (LAN) and, in particular, to a technology of achieving an automatic operation thereof.

There have been broadly utilized distributed computer systems including a plurality of computers coupled with each other via a network, for example, an LAN for conducting operations in a distributed processing fashion. In regard to the distributed computer system of this kind, there has been known an automatic operation technology to carry out a control operation in which the computers of the system are automatically started and/or terminated to save human power in the system operation.

As a technology associated with the automatic operation of the distributed computer system, there has been known an automatic operation system described in the Hitachi's Manual "A Guide to Operation for Integrate Automatic Operation Monitor "AOMPLUS", Program for VOS 3", 1991, September. The automatic operation system relates to a composite processor system in which each processor thereof is started or terminated according to a schedule beforehand loaded therein. The schedule is set, for example, as described in page 30 of the Hitachi 's Manual. Namely, the user of the system creates at least one schedule pattern defining a starting and terminating schedule for each processor. In the daily operation, the user specifies the pattern or one of the schedule patterns for the pertinent day to thereby generate the daily schedule.

In short, defining the start/termination schedule for each computer, the user can apply the conventional automatic operation system to the distributed computer system.

In the distributed computer system, however, various functions are distributed to the respective computers to increase usability of the system. In general, each computer executes processing by use of resources of hardware and software of the other computers. Consequently, for one of the computers of the distributed computer system to accomplish a desired operation, there is required a relation of dependence, namely, it is necessary that the other computers are also in operation. When the system size of the distributed computer system is increased, the dependence becomes more complex.

In consequence, when the automatic operation system of the prior art is applied to the distributed computer system, the user is required to examine the dependence between the computers such that the start and termination schedule of each computer is decided in consideration of the dependence. In other words, it is necessary for the user to guarantee that the complicated dependence between the computer is appropriately reflected on the start and termination schedule. However, it is difficult for the user to recognize the complex dependence between the computers of the distributed computer system, which increases load imposed on the user in the creation of the start and termination schedule.

SUMMARY OF THE INVENTION

It is therefore an object of the present invention to provide a distributed computer system capable of automatically generating an automatic operation schedule of the system in consideration of dependence between computers thereof.

Another object of the present invention is to provide a distributed computer system capable of supplying the user with the dependence between computers thereof in a clear and simple form.

Still another object of the present invention is to provide a distributed computer system capable of guaranteeing in response to indication of starting or terminating a computer that the computer is started or terminated with the dependence held between the computers.

In order to achieve the objects according to the present invention, in a distributed computer system including a plurality of computers linked with each other via a communication path in which each computer conducts operations by using resources of the other computers, there is created schedule information defining a schedule to transfer each of the computers to a particular state. The schedule is produced, for example, as follows. That is, there is inputted first information for each computer specified for generation of schedule information. The first information includes description of relationships between the pertinent computer and other computers of which resources are used by the pertinent computer, the relationships being required to be satisfied or held in the transition of the computer to the particular status. According to the first information thus inputted for each computer, there is generated second information which links information items of identification representing the respective computers for which schedule information is to be generated, the information items being linked with each other according to relationships between the computers respectively associated therewith. On the basis of the resultant second information, for each computer for which schedule information is desired, there is produced schedule information defining a schedule to transfer the status of the computer to a particular status while satisfying all relationships described in the first information of the computers associated with the schedule information.

In accordance with a schedule generating method of a distributed computer system according to the present information, for each computer specified for generation of schedule information, there is employed first information including description of relationships between the pertinent computer and other computers of which resources are used by the pertinent computer, the relationships being required to be satisfied in the transition of the computer to the particular status. On the basis of the first information, there is first produced second information which links information items of identification representing the respective computers for which schedule information is to be generated, the information items being linked with each other according to relationships between the computers respectively associated therewith. For each of the computers, according to the second information, there is created schedule information which defines a schedule to transfer the status of the computer to a particular status while satisfying all relationships described in the first information of the computers associated with the schedule information.

With the provision above, it is not necessary for the user to consider the dependence of the whole system. Namely, the user need pay attention only to dependence between two computers when preparing the schedule. This means that the problem in the scheduling stage can be solved under a minimized condition, which facilitates creation of the schedule. Additionally, since the schedule is generated according to the first information representing the dependence between the computers, the dependence which is an important issue when functions are distributed in the distributed computer system can be appropriately reflected on the schedule. This consequently guarantees acceptability of the schedule and verification thereof can be dispensed with.

BRIEF DESCRIPTION OF THE DRAWINGS

These and other objects and advantages of the present invention will become apparent by reference to the following description and accompanying drawings wherein:

FIG. 5 is a diagram showing constitution of a dependence information definition file in the embodiment according to the present invention;

FIG. 6 is a diagram showing an alternative constitution of the dependence information definition file in the embodiment according to the present invention;

FIG. 10 is a diagram showing structure of a dependent definition file of whole system in the embodiment according to the present invention;

DESCRIPTION OF THE PREFERRED EMBODIMENTS

Figure 1:
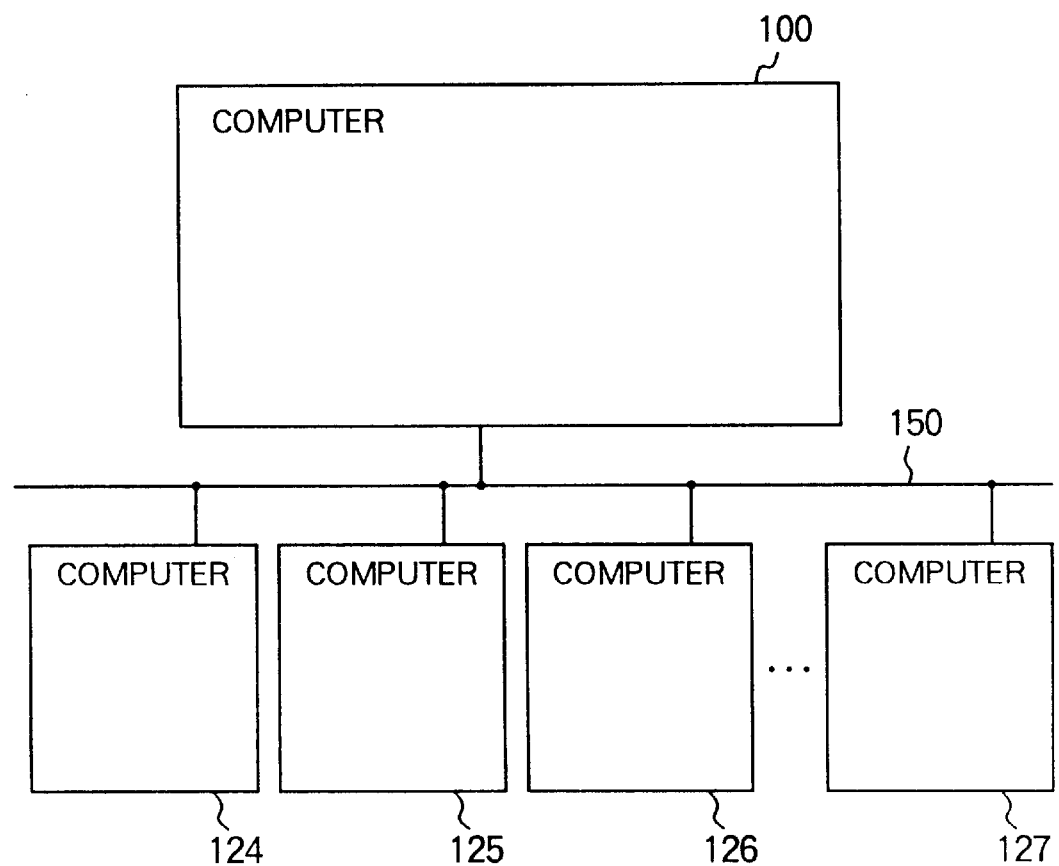
FIG. 1 is a block diagram showing the construction of an embodiment of a distributed computer system according to the present invention.

FIG. 1 shows the configuration of an embodiment of a distributed computer system according to the present invention.

Figure 2:
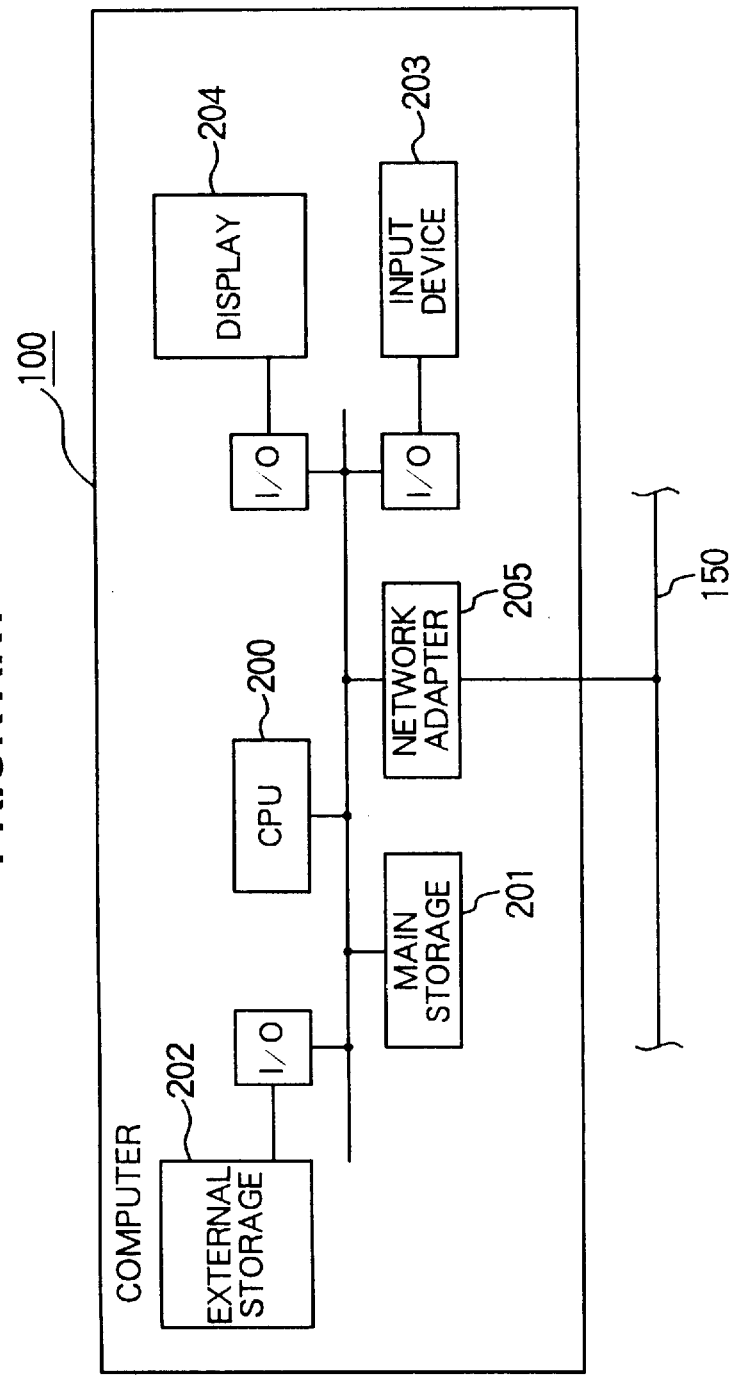
FIG. 2 is a block diagram showing the configuration of an embodiment of a computer according to the present invention.

In the configuration diagram, a reference numeral 100 indicates a computer selected from the computers of the system as the primary computer for the automatic operation, numerals 124 to 127 denote the other computers for the automatic operation, a numeral 150 designates a network for linking the respective computers 100 and 124 to 127 of the system with each other. Each of the computers 100 and 124 to 127 is manufactured according in a generally known construction as a computer. FIG. 2 shows structure of the computer 100. Although description will be given of the configuration of the computer 100, the other computers 124 to 127 are also constituted in a way similar to that for the computer 100. In this regard, these computers need not be necessarily constructed in the same manner. For example, as shown in FIG. 2, the computer 100 includes a central processing unit (CPU) 200, a main storage 201, an external storage 202, an input device 203 including for example, a keyboard and/or a pointing device, various output devices such as a display 204 including a cathode-ray tube (CRT), and a network adapter 205 for establishing connection to the network 150. The respective computers 100 and 124 to 127 collectively constitute a distributed computer system in which each of these computers executes processing by mutually providing own functions and resources to the other computers or using functions and resources of the other computers.

The computers 100 and 124 to 127 execute programs stored in the main storage 201 in cooperation with an operating system (OS) providing an environment of the distributed computer system described above so as to achieve many processes including user processes of the users.

Figure 3:
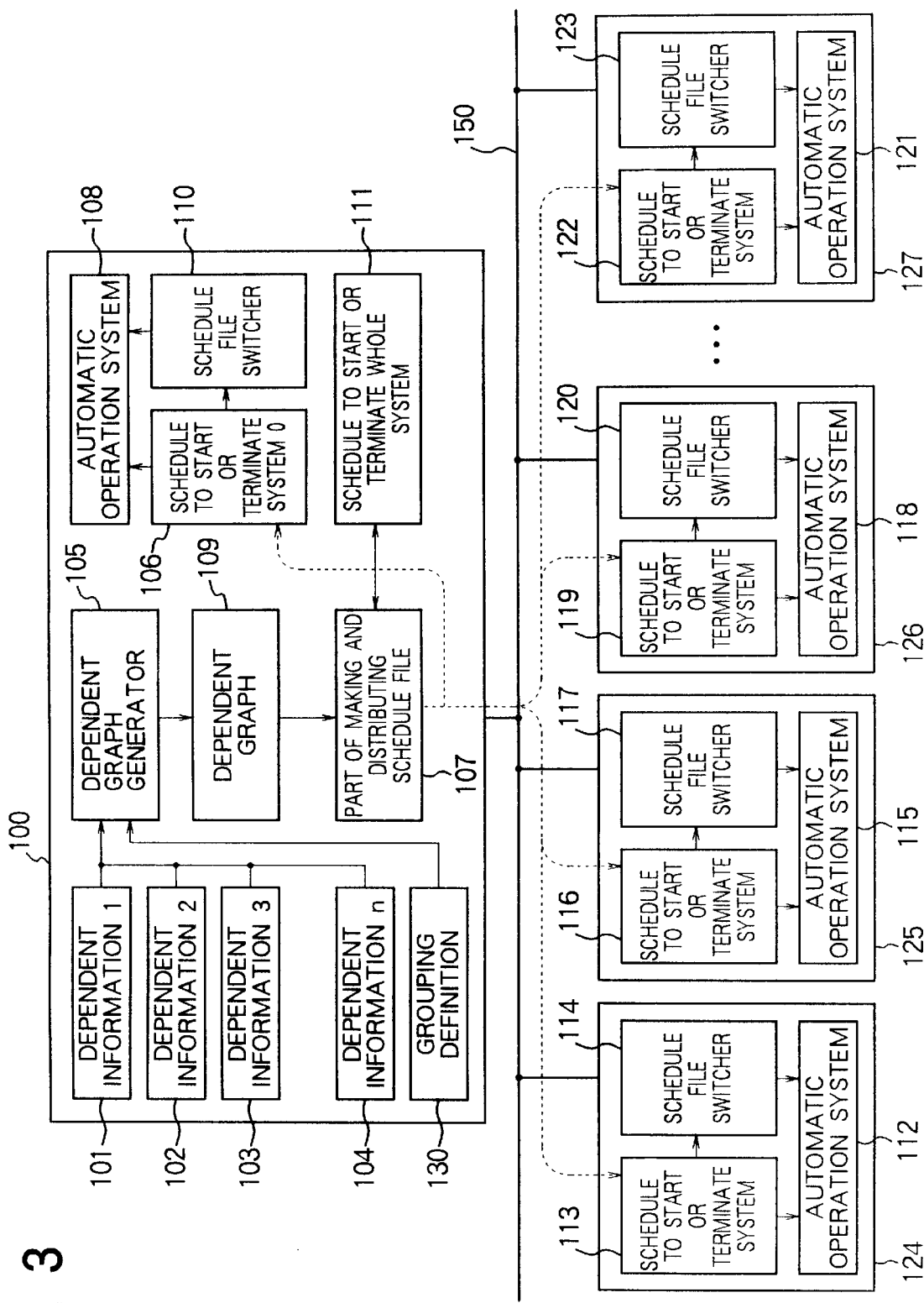
FIG. 3 is a block diagram partially showing the configuration related to automatic operation of the embodiment of the distributed system according to the present invention.

FIG. 3 is a logical configuration diagram related to the distributed computer system of FIG. 1 including a functional section implemented by processes associated with the automatic operation and creation of an automatic schedule in the embodiment and various information items related to the automatic operation and creation of an automatic schedule. The information items are actually stored in the main storage 201 and/or the external storage 202.

In FIG. 3, dependent information definition files 101 to 104 include information to be stored in the computer 100. Each of the files 101 to 104 corresponds to either one of the computers 100 to 127. For the pertinent computer, the pertinent dependent information definition file provides information denoting dependence of the computer to the other computers.

Disposed in the computer 100 is a dependent graph generator 105 which reads information from the dependent information definition files 101 to 104 to create a dependent graph 109 therefrom. Description of the dependent graph 109 will be given later in this specification.

In the computer 100, there is also arranged a part of making and distributing schedule files 107 which creates a schedule to start or terminate whole system 111 according to the dependent graph 109 and then produces therefrom start and termination schedules 106, 113, 116, and 122 to be stored in the computers 100 and 124 to 107 in a respective fashion. Additionally, the schedule file generating and distributing part 107 respectively distributes the generated schedules 106, 113, 116, and 122 to start or terminate system to schedule file switchers 110, 114, 117, 120, and 123. The generated schedules 106, 113, 116, and 122 include information of schedules to start or terminate the associated computers, respectively.

The schedule file switchers 110, 114, 117, 120, and 123 are arranged in the computers 100 and 124 to 127 in a respective manner. The switchers 110, 114, 117, 120, and 123 replace the start and termination schedules respectively used by automatic operation systems 108, 112, 115, 118, and 121 of the computers 100 and 124 to 127 respectively associated with the switchers 110, 114, 117, 120, and 123 with the start and termination schedules 106, 113, 116, and 122 received from the schedule making and distributing part 107.

The automatic operation systems 108, 112, 115, 118, and 121 are also disposed in the computers 100 and 124 to 127, respectively. Each of the automatic operation systems 108, 112, 115, 118, and 121 controls the automatic operation of the pertinent computer according to the procedure described in the schedule to start or terminate system stored in the computer.

In the configuration, a reference numeral 130 indicates a grouping definition file disposed in the computer 100 achieving the primary function in the automatic operation. The file 130 contains information defining the computers to be subjected to the automatic operation.

Figure 4:
FIG. 4 is a diagram showing structure a grouping definition file in the embodiment according to the present invention.

FIG. 4 shows structure of the grouping definition filed 130 adopted in the embodiment.

As can be seen from FIG. 4, the grouping definition file 130 of the embodiment includes a plurality of records, each including two fields. The first field is an indispensable field to specify a (host) name identifying a computer for the automatic operation. The second field is a comment field and it is not necessarily required to specify this field. Moreover, in the field, a string of characters subsequent to a sharp sign "#" is treated as the contents of the comment.

FIG. 5 shows an example of constitution of the dependent information definition files 101 to 104.

As already described, the files 101 to 104 are disposed respectively corresponding to the computers 100 and 124 to 127. Each of the files 101 to 104 indicates, for the pertinent computer, dependence between the computer and the other computers. The dependent information definition file need not be necessarily specified for all computers. For example, the file may be dispensed with for a computer having no dependence to the other computers. An example of the configuration of the dependent information definition file is shown in FIG. 5.

The file of FIG. 5 includes a plurality of records 452 to 454, each records including six fields 401 to 406.

Described in the first field 401 is a host name of a computer having dependence with respect to a computer associated with the dependent information definition file.

The second and third fields 402 and 403 are used to store therein the contents of dependence between the computer specified in the first field and that related to the dependent information definition file. In the second field 402, there are stored the contents of dependence that the computer is required to be started before the computer corresponding to the dependent information definition file is started. Specifically, a start condition is described in the second field 402. In this example, a period of time which is to be elapsed from when the computer described in the first field 401 is started to when the computer related to the the dependent information definition file is started is described in minutes in the field 402. In the third field 403, there are stored the contents of dependence that the computer is to be terminated before the computer associated with the dependent information definition file is terminated. Concretely, in the third field 403, there is described a period of time in minutes to be elapsed from when the computer described in the first field 401 is terminated to when the computer related to the the dependent information definition file is terminated.

In the fourth to sixth fields 404 to 406, there is described information related to the date of occurrence of the dependence. Namely, the fields 404 to 406 contain the month, day, and day of week, respectively. In this embodiment, when the the fourth to sixth fields 404 to 406 need not be particularly specified, asterisks "*" are stored as wild-card symbols therein. In this case, there is assumed a default value indicating dependence between the computer related to the dependent information definition file and a computer specified in the first field 401 regardless of the information of date. In the example shown in FIG. 5, the fourth to sixth fields 404 to 406 are specified with wild-card symbols, i.e., default values. Consequently, it is indicated that the dependence specified by the second and third fields 402 and 403 is assumed between the computer daily specified in the first field 401 and the computer associated with the dependent information definition file.

In this regard, when it is desired to described a comment in a field, the user need only write the comment with an asterisk "#" at the first position thereof.

FIG. 6 shows constitution of another example of the dependent information definition file.

This file shown in FIG. 6 differs in descriptions of the second and third fields 502 and 503 from those shown in FIG. 5.

In the dependent information definition file of FIG. 6, the start and termination conditions are specified with keywords representing statuses of computers in place of values of time.

For example, the second field 502 of the first record 552 contains "ipl". This entry means a relationship of dependence that the computer associated with the dependent information definition file 500 can be started only when the computer specified in the first field 501, namely, the computer having a host name of "host0" is in a state of loading an initial program. In short, described in the second field 502 is a status to which the computer described in the first field 501 is required to be set before the computer corresponding to the file 500 is initiated. Furthermore, the third field 503 of the first record 552 contains "init0". This indicates a relationship of dependence that the computer associated with the file 500 can be terminated only when the computer specified in the first field 501 is not executing any user process, for example, in a state where the computer is executing only a process of a kernel of the operating system. In other words, in the second field 502 there is described a status to which the computer described in the first field 501 is to be set before the computer related to the file 500 is terminated. In this diagram, "boot", "shutdown", and "poweroff" represent a booting state of the system, a terminated state or logically deactivated status of the system, and a shutdown state or physically deactivated status of the system, respectively.

Figures 7, 8:
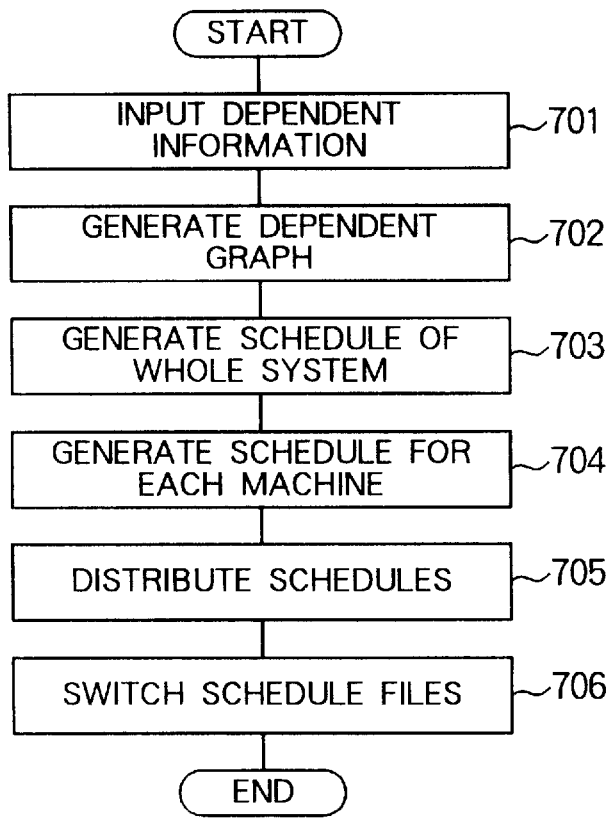
FIG. 7 is a diagram showing the configuration of start/termination schedule information in the embodiment according to the present invention.
FIG. 8 is a flowchart showing an operation flow in the embodiment of the distributed computer system according to the present invention.

Subsequently, FIG. 7 shows the configuration of the schedules to start or terminate system 106, 113, 116, 119, and 122.

As described above, the schedules 106, 113, 116, 119, and 122 are prepared in association with the respective computers and hence are distributed to the associated computers, respectively. Each schedule includes information defining a procedure to start or terminate the pertinent computer.

The start or termination schedule includes a plurality of records 352 to 358 as shown in FIG. 7. Each record includes four fields 301 to 304. In the first and second fields 301 and 302, there is described information of date to automatically start or terminate the computer associated with this schedule. Specified in the first and second fields 301 and 302 are "month and day" and "day of week", respectively.

In the third and fourth fields 303 and 304, there is described information of time. Namely, a point of time when power of the computer is turned on and a point of time when power of the computer is powered off are specified in the third and fourth fields 303 and 304, respectively.

In the first and second fields 301 and 302 to respectively specify the month and day and the day of week, when it is desired to specify a range of "month and day" or "day of week" for automatic operation, the user need only use a hyphen "-" to link two items of "month and day" or "day of week". Moreover, to specify two or more days, a plurality of entries of "day" may be specified with a comma" therebetween. In this embodiment, when specifying the second field 302 for the week of day, there are adopted keywords "mon", "tue", "wed", "thr", "fri", "sat", and "sat" (second record 352). Moreover, the starting and terminating points of time respectively of the third and fourth fields 303 and 304 are designated by values of time in the 24-hour time notation.

The third field 303 of, e.g., the third or seventh field 353 or 357 contains a keyword of "holiday", which indicates that the computer is not powered. When an asterisk "*" is specified in a field, for example, as shown in the second field 302 of either one of the third to seventh records 353 or 357, it is regarded as a wild card for the associated default value. That is, as shown in the first field 301 of the second record 352, when the month and day is specified with an asterisk, it is assumed that the default value of start or termination time is described in the field 301.

FIG. 8 is a flowchart showing an operation flow of a process of setting an automatic operation schedule in the embodiment of the distributed computer system according to the present invention.

In step 701, the dependent graph generator 105 of the computer 100 as the central constituent facility of the automatic operation references the grouping definition file 130 to gather the dependent information definition files 101 to 104 associated with all computers belonging to the group defined for automatic operation. In step 702, the graph generator 105 merges the files 101 to 104 collected in step 701 and processes relationships of dependence to create the dependent graph 109.

In step 703, the part to make and distribute schedule files 107 then generates a schedule to start or terminate whole system 111 indicating a start or termination schedule for the entire system according to the dependence presented in the dependent graph 109 produced in step 702. In step 704, the part 107 accesses the whole system schedule 111 to acquire therefrom only portions related to the respective computers to create a schedule to start or terminate system for each computer. Thereafter, in step 705, the part 107 distributes the system start or termination schedule prepared in step 704 to the associated computer.

Subsequently, each of the schedule file switchers 110, 114, 117, 120, and 123 of the corresponding computers substitutes its currently effective schedule for that distributed thereto in step 706. The automatic operation systems 108, 112, 115, 118, and 121 of the related computers thereafter respectively control start and termination of the corresponding computers according to the switched start or termination schedules, respectively.

Figure 9:
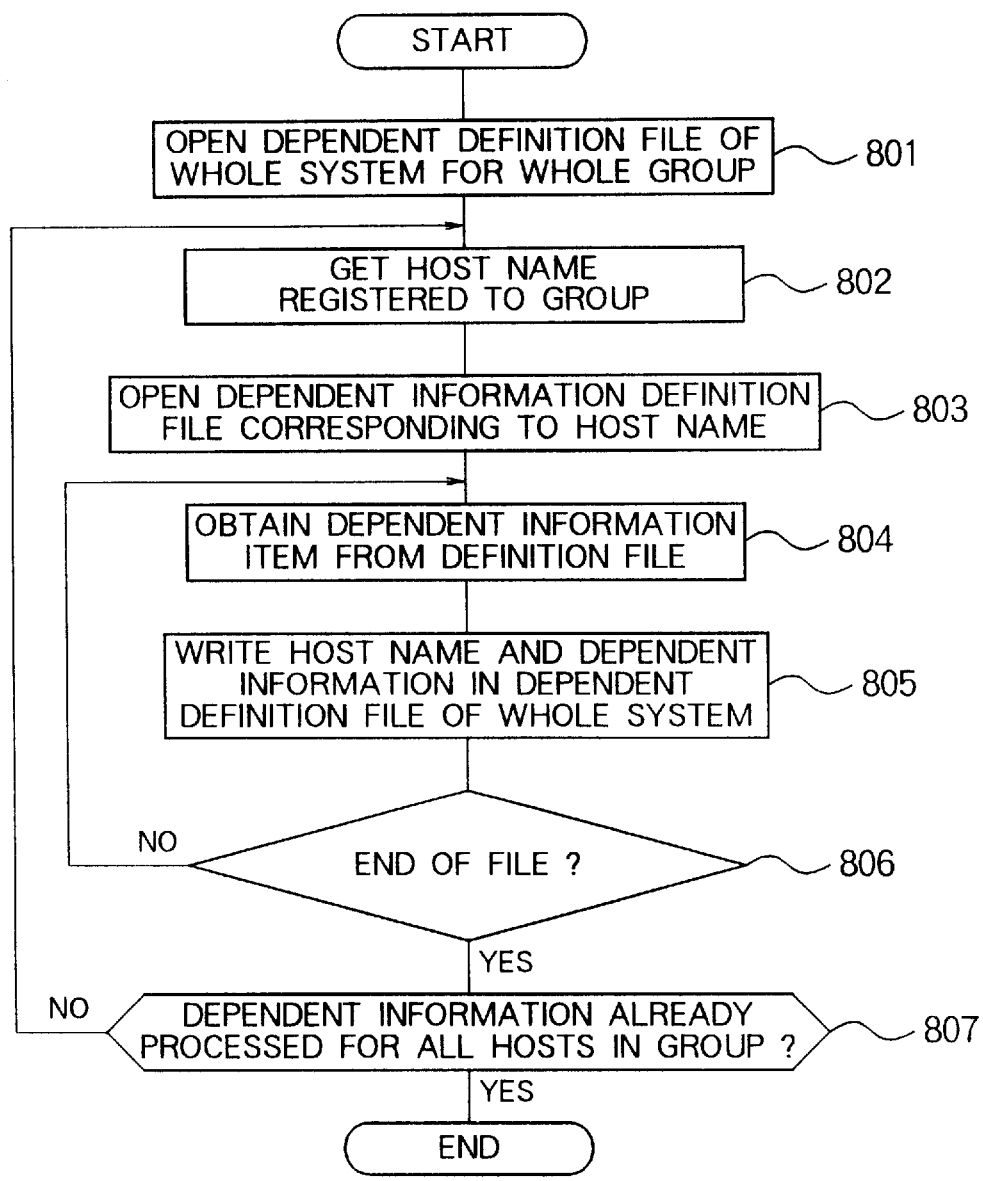
FIG. 9 is a flowchart showing a procedure of merging the dependence definition file in the embodiment according to the present invention.

FIG. 9 is a flowchart showing in detail a procedure of process accomplished by the dependent graph generator 105 in step 701.

In step 801, the generator 105 opens the dependent definition file of whole system defining relationships of dependence of the entire group. The dependent definition file of whole system will be described in detail later in this specification.

In step 802, the generator 105 references the grouping definition file 103 to obtain the name of the computer belonging to the group specified for automatic operation.

In step 803, the generator 105 opens the dependent information definition file associated with the computer name attained in step 802. In step 804, the generator 105 reads one record from the dependent information definition file opened in step 803 and then writes the computer name obtained in step 802 and the dependent information definition file in the dependent definition file of whole system opened in step 801.

Next, in step 806, the generator 105 judges to determine whether or not all information items registered to the dependent information definition file opened in step 803 have already been processed in steps 804 and 805. If the items have already been processed, the generator 105 closes the dependent information definition file opened in step 803 and then passes control to step 807. In case where there remains information to be processed, the generator 105 returns control to step 804 to repeatedly execute the processing for the next record of the dependent information definition file.

In step 807, the generator 105 checks to decide whether or not the processing ranging from steps 802 to 806 has already been executed for all computers registered to the grouping definition file 130. If this is the case, the generator 105 terminates the processing. If there remains any computer for which dependent information is to be processed, the generator 105 repeatedly executes the processing from step 802 to 807 for the next dependent information definition file.

As a result of processing above, information items of the respective dependent information definition files are merged to be stored in the dependent definition file of whole system.

In this connection, the dependent definition file of whole system is configured as shown in FIG. 10.

As can be seen from this diagram, the dependent definition file of whole system includes a plurality of records 952 to 955, each record including seven fields 901 to 907. In each record, the second field 902 to seventh field 907 have the same contents as the first to sixth fields of the dependent information definition file of system for each computer shown in FIG. 5. In the first field 701, there is described a name of the computer corresponding to the dependent information definition file associated with the record.

Incidentally, as already described, in case where a computer does not have the dependent information definition file, no record of the dependent definition file of whole system contains the name of the computer in the first field 901 thereof.

Through the above processing, the dependent information definition files defining dependent information items of the respective computers are merged into one file.

Next, description will be given in detail of the dependent graph generating process accomplished by the dependent graph generator 105 in step 702 of FIG. 8.

In step 702, the generator 105 creates node information of each node of the dependent graph 109 for each computer in the dependent definition file of whole system according to the start condition (in the third field 903) and termination condition (in the fourth field 904) of the dependent definition file of whole system.

Figure 11:
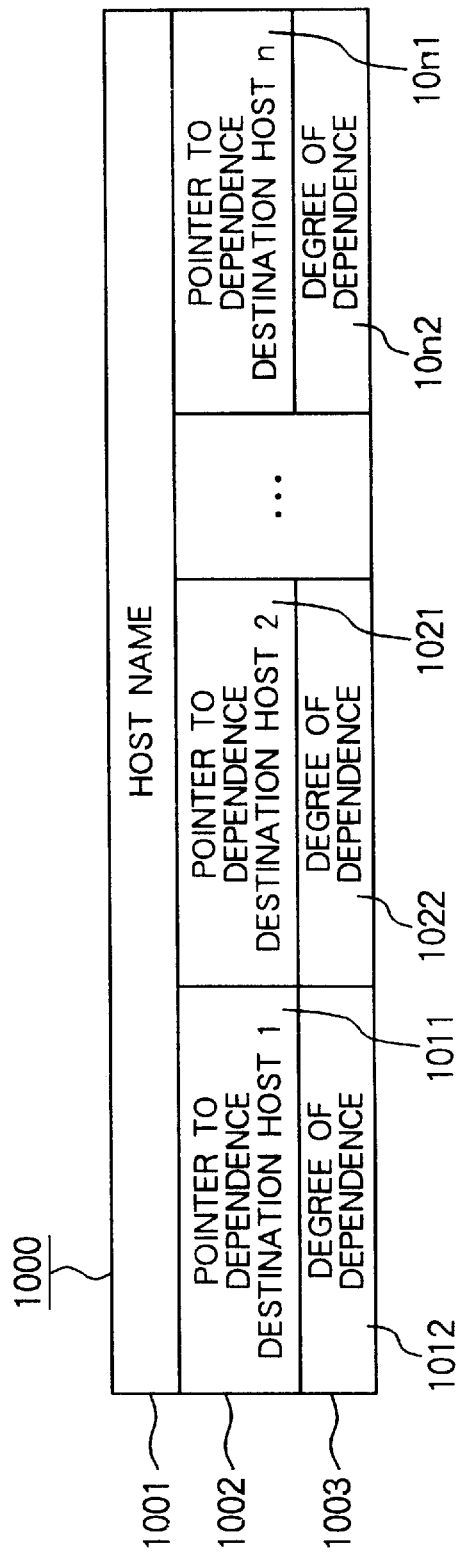
FIG. 11 is a diagram showing constitution of node information in the embodiment according to the present invention.

FIG. 11 shows the layout of the node information items created for the start condition.

As shown in FIG. 11, each node information includes three entries. In the first entry 1001, there is specified a name of the computer represented by the node. Described in the second entry 1002 is a pointer to node information of a computer on which the computer denoted in the first entry 1001 is dependent. In the third entry 1003, there is specified a degree of dependence on the computer designated by the pointer of the second entry 1002. This entry is information defined as the start condition in the third field 903 of the dependent definition file of whole system. In this connection, a plurality of pairs including the second and third entries 1002 and 1003 may be specified in one node information item (1011 and 1012; 1021 and 1022, and 10n1 and 10n2). In case where the computer registered to the first entry 1001 is dependent on a plurality of computers, there are specified a plurality of pairs including the second and third entries 1002 and 1003.

As above, each node information 100 is configured as a structure including a destination of dependence and a degree thereof. Moreover, also for the terminating condition (in the fourth field 1004 of the dependent definition file of whole system), node information of each computer is generated in the similar fashion. In this case, the third entry contains information defined as the termination condition in the third field 904 of the dependent definition file of whole system.

Figure 12:
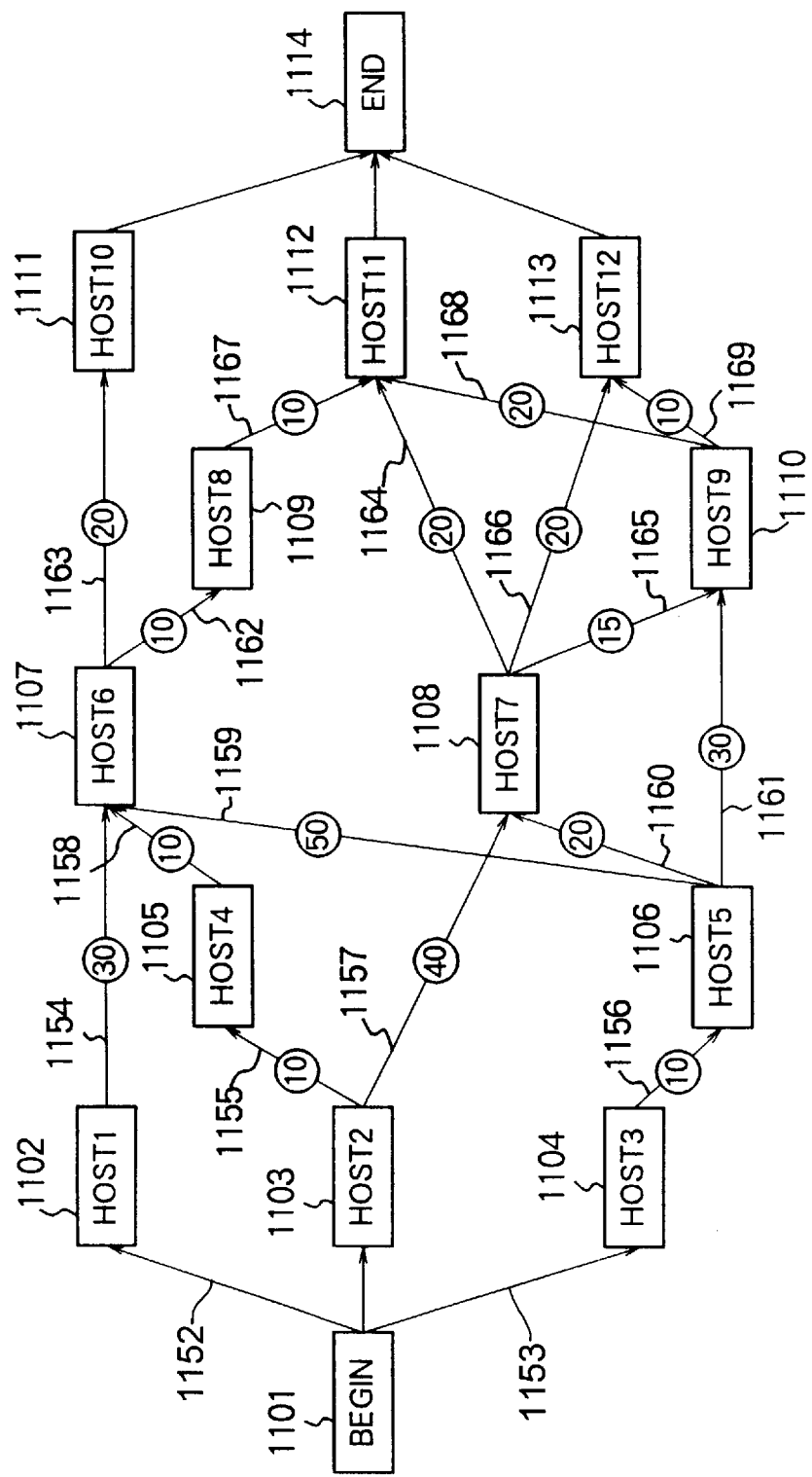
FIG. 12 is a diagram showing a dependent graph created from the node information in the embodiment according to the present invention.

FIG. 12 schematically shows the dependent graph constructed as a set of node information items. This diagram shows by way of illustration a dependent graph including node information created according to start conditions. In the graph, a frame represents a node constituting a 1101–1114 dependent graph. In these nodes, nodes 1102 to 1113 respectively correspond to node information items prepared for the computers of which the host names are denoted in the associated frames. Line segments 1154 to 1169 establishing links between the nodes indicate relationships of dependence therebetween. In other words, the dependent graph shows that the start condition of the computer associated with the node on the right side of the arrow is dependent on the status of the computer corresponding to the node on the left side of the arrow. The dependence is designated by a pointer specified in the record 1102 of the dependent definition file of whole system. A numeral enclosed with a circle over each arrow represents the degree of dependence indicated by the arrow. The degree of dependence is the same as that specified in the third record 1103 of the dependent definition file of whole system. In FIG. 12, the line segment 1154 connecting the node "HOST1" 1102 to the node "HOST6" 1107 has a value of "30" as the degree of dependence. This means that the node "HOST1" 1102 exerts influence on the node "HOST6" 1107. That is, the computer having the name "HOST6" is dependent on that having the name "HOST1". The value "30" as the degree of dependence indicates that "HOST1" is required to be started 30 minutes before initiation of "HOST6".

Additionally, the arrow marks 1154, 1158, and 1159 to "HOST6" 1107 designate that "HOST6" is dependent on the statuses respectively of these computers "HOST1", "HOST4", and "HOST6".

In this regard, for termination conditions, the concept of the dependent graph represented by a set of node information items created according to the termination conditions can also be represented in a similar manner as for FIG. 12. In this situation, however, the kind of dependence between nodes is different from that employed for the start conditions. For example, assuming that FIG. 12 is a dependent graph associated with the termination conditions, the dependent degree "30" designates that "HOST6" is required to be terminated 30 minutes prior to termination of "HOST1".

Moreover, when the dependence includes specifications of the day and time, week of day, and the like, the node information is created so that the dependent graph is constructed for each of the day and time and day of week.

In the following description, a set of node information items constituting each dependent graph associated with the start conditions of each of the day and time and day of week and a set of node information items constituting each dependent graph associated with the terminating conditions of each of the day and time and day of week will be collectively called a dependent graph for convenience.

Figure 13:
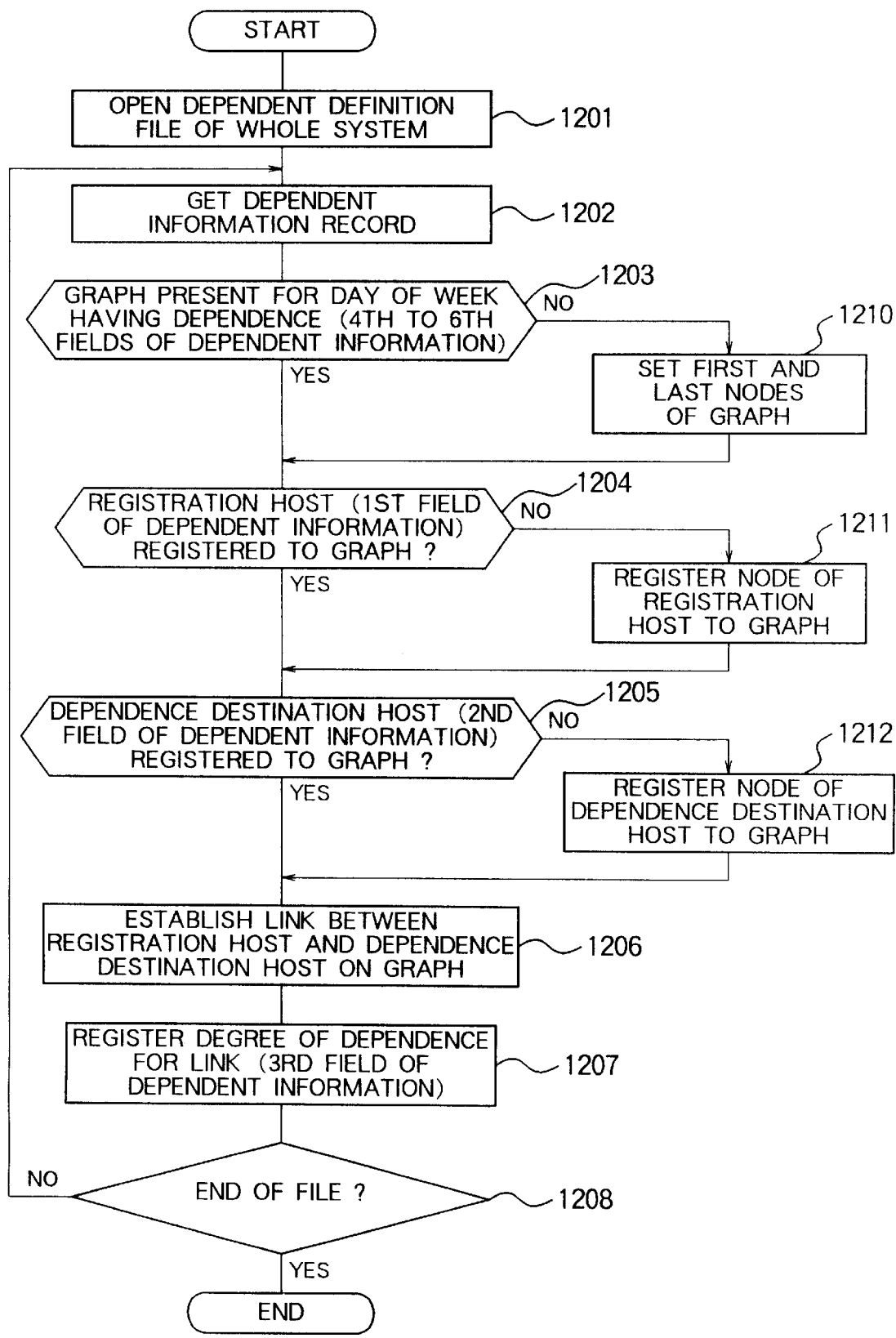
FIG. 13 is a flowchart showing a procedure of creating the dependent graph in the embodiment according to the present invention.

FIG. 13 is a flowchart showing the detailed process of generating the node information.

The process shown in FIG. 13 is executed for each of the start condition (in the third field 903) and terminating condition (in the fourth field 904) of the dependent definition file of whole system 900. Description will be now given of the process for the start condition.

First, the dependent definition file of whole system 900 is opened in step 1201 to obtain one record from the file 900 (step 1202). In step 1203, the day and time and day of week are attained from (the fourth to sixth fields of) the record to make a search for a dependent graph related to the start conditions for the day and time and day of week.

If a desired dependent graph is found, control is passed to step 1204. Otherwise, in step 1210, a first node (begin) and an end node (end) are generated to be linked with each other in a process to create a new dependent graph. Control is then passed to step 1204 (step 1210).

In step 1204, a search is carried out to determine whether or not the node corresponding to the computer (specified in the first field of the obtained record) as the object of registration exists in the dependent graph.

If the pertinent node information is present, control is transferred to step 1205; otherwise, node information is created for the computer as the object of registration and then control is passed to step 1295 (step 1211).

In step 1205, a retrieval process is achieved to decided whether or not a computer on which the computer as the object of registration is dependent exists in the dependent graph. Specifically, a check is made to determine whether or not node information has already been generated for the computer set in the second field of the attained record. If the pertinent node information is present, control is transferred to step 1206. Otherwise, node information is additionally created for the computer as the destination of dependence in a manner similar to that of step 1211 and then control is passed to step 1206 (step 1212).

In step 1206, a link is established between node information items respectively obtained in steps 1204 and 1205. Concretely, a pointer to node information attained in the step 1205 or 1212 is set to the second entry 1002 of node information obtained in step 1204 or 1211. Moreover, a degree of dependence is set for the link (step 1207). Specifically, the value described as the degree of dependence in the third field of the record attained in step 1202 is set to the third entry 1003 of node information obtained in step 1204 or 1211.

Finally, in step 1208, a check is made to decide whether or not the process above has already been executed for all records defined in the file opened in step 1201. If there remains any record to be processed, the process from step 1202 to 1208 is executed again. If all records have already been processed, the processing is terminated.

As a result of the processing, there is completely produced a dependent graph related to the start conditions of the day and time and day of week. Also for the terminating conditions, there can be created a dependent graph related to the start conditions of the day and time and day of week through a similar process.

When it is desired to register new node information in step 1211, the registration is carried out under the following conditions.

(1) In case where neither node information of the registration computer as the object of registration nor node information of the dependence destination computer has been registered, the new node information is inserted between the first node information and the last node information.

(2) In case where only the node information of the dependence destination computer has been registered, the new node information is inserted between the node information of the dependence destination computer and the last node information.

Moreover, when the registration of new node information is desired to be registered in step 1212, the new node information is inserted between node information of the computer as the object of registration and the first node information.

The new node information is inserted between two existing node information items as follows. From the node information items, there is selected a node information item on the end side. The pointer set in the second entry 1002 of the node information item on the end side to indicate the node information item on the start side is replaced with a pointer indicating the node information to be inserted. In the second entry 1002 of the inserting node information, there is set the pointer registered to the node information item on the end side, namely, the pointer indicating the node information item on the start side.

In the embodiment, as the first node information in the first entry 1001 as shown in FIG. 11, there is described, in place of the computer name, an information item, for example, "begin" indicating that the node information is related to the first node of the dependent graph. Similarly, as the last node information in the first entry 1001, there is set an information item, for example, "end" denoting that the node information is associated with the last node in the dependent graph. The degree of dependence is set to "0" between the first node information and the node information of the computer and between the last node information and the node information of the computer. However, another value may also be specified for the degree of dependence. For example, assuming that the first and end nodes represent events or either one thereof represents an event, there may be set the degree of dependence according to dependence with respect to the events or event.

As described above, in step 703 of FIG. 8, according to the dependent graph, the part to make and distribute schedule files 107 generates the schedule to start or terminate whole system 111 to which the start or termination time of each computer is set. In the production of the schedule 111, there may be employed, for example, an algorithm known for the shortest route problem. Description will now be given of the creation of the schedule 111.

(1) First, the first node "begin" 1101 is set as the retrieval object.

(2) Retrieval is conducted for all paths related to dependence to nodes as the retrieval objects. For example, if the node "begin" 1101 is specified as the retrieval object in FIG. 12, a search is achieved for paths 1152 to 1154.

(3) For each path searched for the retrieval objective node, the degree of dependence of the path is subtracted from the start time of the node which is related to the path and which is specified as the source of dependence. Resultantly, the earliest start time obtained from the results of subtraction is determined as the start time of the retrieval objective node. In this operation, if there is missing a node which is dependent on the node connected via the searched path (e.g., node 1114), the start time of the node is set to the default value beforehand set in the system, for example, as the system operation start time.

(4) When the start time is not determined for the node which is dependent on the node connected via the searched path, the processes (2) and (3) above are carried out for the node specified as the retrieval object.

As above, the processes (2) and (3) are recursively applied successively to the nodes beginning at the first node "begin" 1101, thereby obtaining the start time of each node.

In this connection, when the dependent graph is generated for each day and time or each week of day, the start time of each node is attained for the day and time or day of week.

The termination time of each node can also be attained for the day and time or day of week in a manner similar to that applied to the start time. On this occasion, however, the process (3) is conducted as follows. Namely, for each path searched for the retrieval objective node, the degree of dependence of the path is added to the termination time of the node which is related to the path and which is specified as the source of dependence. As a result, the latest termination time obtained from the results of addition is decided as the termination time of the retrieval objective node. In addition, if there is missing a node which is dependent on the node connected via the searched path (e.g., end node 1114), the termination time of the node is set to the predetermined default value, for example, as the termination time of system operation. Incidentally, when the processing is executed for the termination condition, it may also be possible to exchange the first node "begin" and the last node "end" used in the processing of the start condition. Moreover, the direction of the arrows in FIG. 12 may be aligned according to the direction of the point of the second entry 1002 of the node information. With this provision, the time-series order of termination matches the direction of the arrow marks from the first node "begin" to the last node "end".

In this connection, the start time and termination time of each node may be obtained as follows. Namely, the processes (2) and (3) above are recursively applied to the nodes beginning at the last node "end" 1114 in place of the first node "begin" 1101. This operation can be achieved by selecting the first node "begin" or the last node "end" as the reference of absolute time.

In addition, for a service associated with a server-client relation, the server is required to be first started at the initiation thereof. Namely, when the system is to be terminated, the client is required to be terminated before the termination of the server. In case where the dependence at the initiation can be directly used also at the termination without any modification thereof as in the above case, the schedule at the termination may be generated according to the dependent graph related to the start condition.

Finally, the part of making and distributing schedule files 107 generates and registers a daily schedule to start or terminate whole system according to the start or termination time of each node for the day and time or day of week. However, the start or termination time need not be registered for the first node 1101 and the last node 1114.

Figure 14:
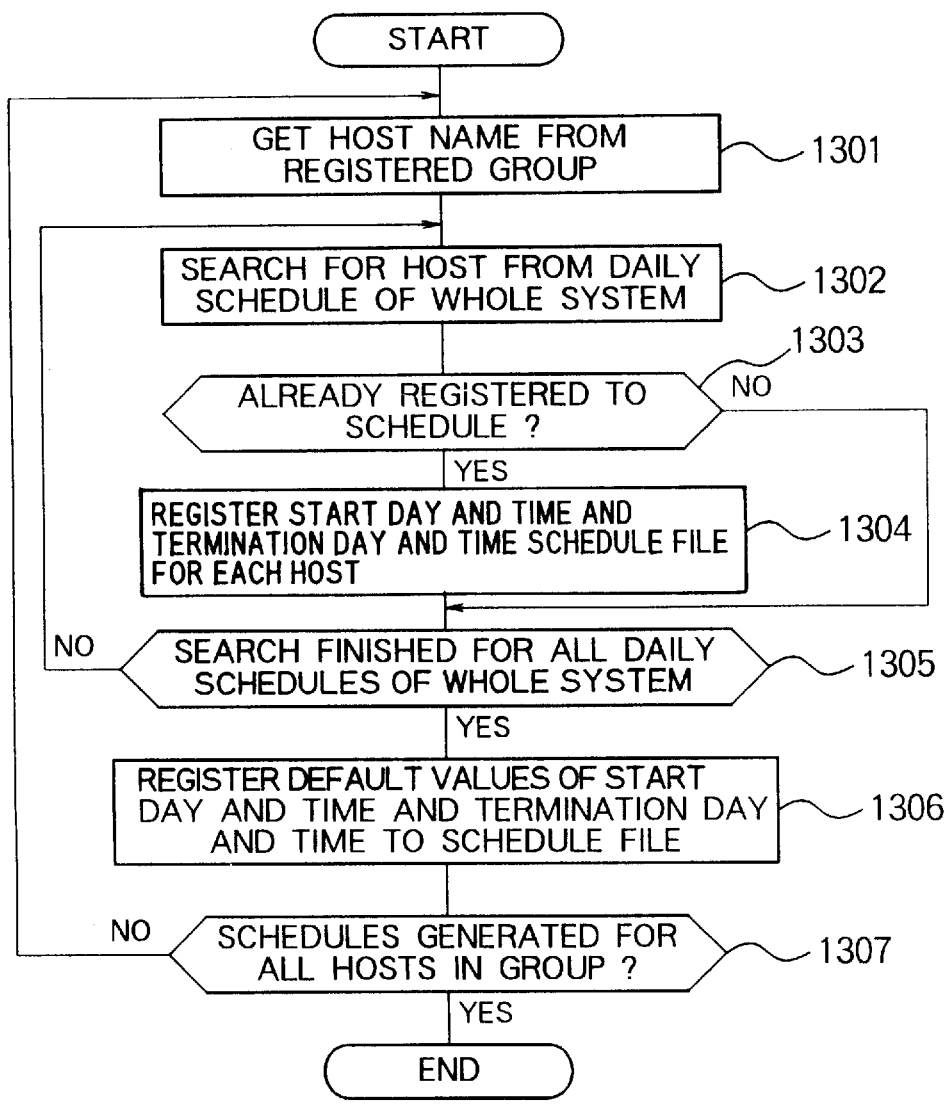
FIG. 14 is a flowchart showing a procedure of generating a schedule to start or terminate system in the embodiment according to the present invention.

FIG. 14 is a flowchart of operation achieved by the part of making and distributing schedule files 107 to generate a schedule to start or terminate system for each computer. In the following description, the schedule to start or terminate whole schedule is assumed to be daily produced.

As can be seen from the flowchart, there is obtained in the process one of the computer names registered to the grouping definition file 130 to set the computer name as the object of processing (step 1301). Next, in step 1302, a search is conducted through the daily schedule to start or terminate whole system 111 to obtain the start time and termination time for the computer selected in step 1301. As a result, if it is found that the objective computer has already been registered to the schedule 111, the date and the start time and termination time registered thereto are described in the schedule to start or terminate system for the objective computer. Control is then passed to the next processing (step 1304).

When the computer selected in step 1301 is missing in the schedule 111, control is passed to step 1305 without executing step 1304. In step 1305, it is judged to determine whether or not all of the generated schedules 111 have already been processed. If there exist remaining schedules 111 to be processed, the processing of steps 1302 to 1304 is executed for the next schedule 111.

When the processing is finished for all schedules 111, the start time and termination time (default values thereof) independent of the day of week are described in the schedule to start or terminate system for the computer as the object of processing in step 1306.

Finally, in step 1307, a check is made to decide whether or not the processing is completely executed for all computers registered to the grouping definition file 130. If there are remaining some computers to be processed, the operation of steps 1301 to 1307 is achieved again for the next computer. When the processing is finished for all computers, the processing of generating a schedule to start or terminate system for each computer is terminated.

In this connection, for a computer having no dependence on other computers, there is created in step 1306 a schedule to start or terminate system to which only the default values of the start time and termination time are set.

Figure 15:
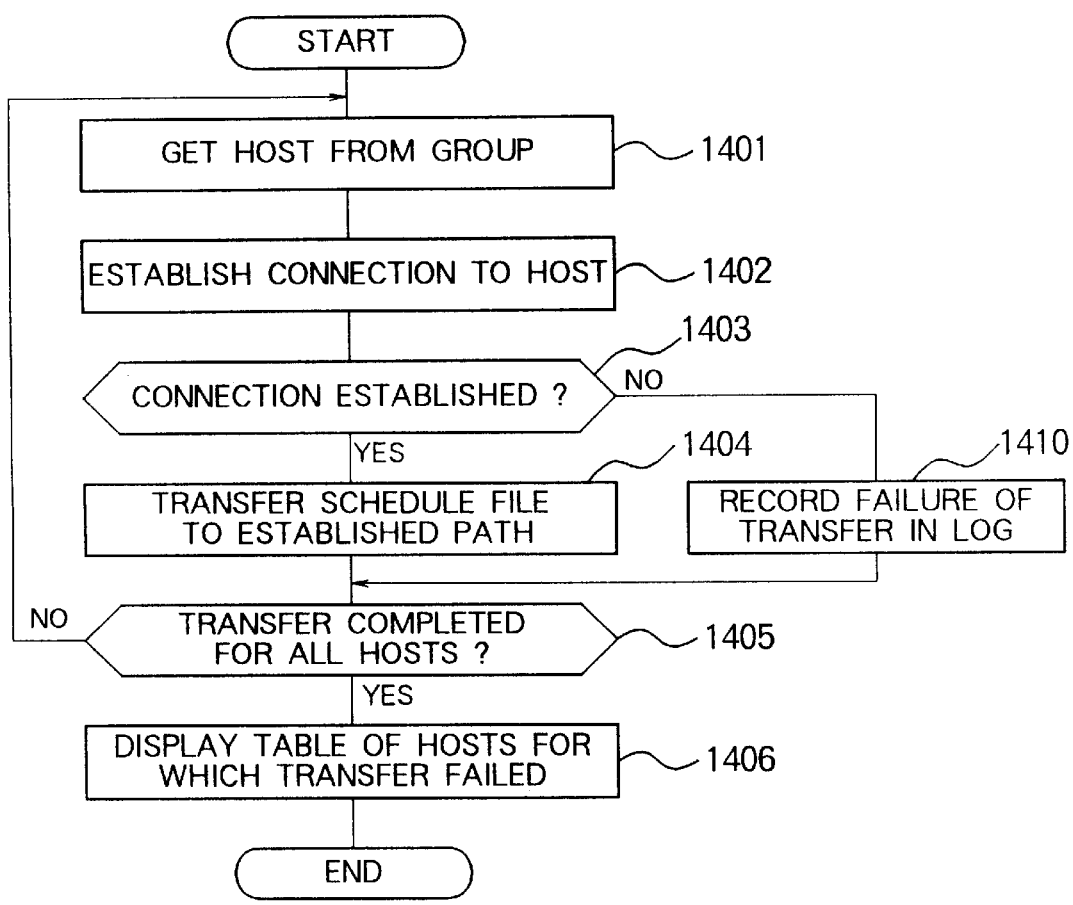
FIG. 15 is a flowchart showing a procedure of distributing the schedule to start or terminate system in the embodiment according to the present invention.

FIG. 15 is a flowchart of the processing executed in step 705 of FIG. 8 by the part of making and distributing schedule files 107 to distribute a schedule to start or terminate system to each computer.

As can be seen from the flowchart of processing, there is acquired the name of a computer registered to the grouping definition file 130.

Subsequently, to achieve communication via the network with the computer having the obtained computer name, there is established a communicating connection (step 1402). In step 1403, a check is conducted to determine whether or not the connection has been established as instructed in step 1402. If the attempt to establish the connection to the objective computer has been failed, "failure in establishing the connection" is recorded in the log in step 1410. If the attempt has been successfully finished, the file containing the schedule to start or terminate system obtained in step 1401 for the pertinent computer is transferred via the network 150 to a logical storage region (path) beforehand determined for the computer (step 1404). The logical storage region is specified in advance as an area for the automatic operation systems 112 to 117 to reference the schedules to start or terminate system.

For the computer 100, since the schedule to start or terminate system has already been loaded thereon, steps 1402 and 1403 are unnecessary. Namely, in step 1404, the schedule need only be transferred to (or stored in) a logical storage zone (path) beforehand allocated for the computer 100.

Next, it is judged to determine whether or not the processing of steps 1401 to 1405 has been completely executed for all computers defined in the grouping definition file 130 (step 1405). If this is the case, control is transferred to step 1406; otherwise, the operation ranging from step 1401 to step 1405 is conducted again for the next computer.

Finally, in step 1406, the messages logged in step 1401 are presented on a display to present a list of computers for which the attempt of transferring the schedule has been failed, thereby terminating the proessing. In this regard, for the computers for which the schedule transfer has been failed, there will be achieved an appropriate operation. For example, the user transfers the schedule thereto.

Moreover, the system may be set such that when the schedules are transferred to all computers without any failure, there is conducted a switching operation of the subsequent schedule to start or terminate system. With this provision, the existing schedule to start or terminate system can be replaced with a new schedule to start or terminate system for each computer without intervention of the user.

Figure 16:
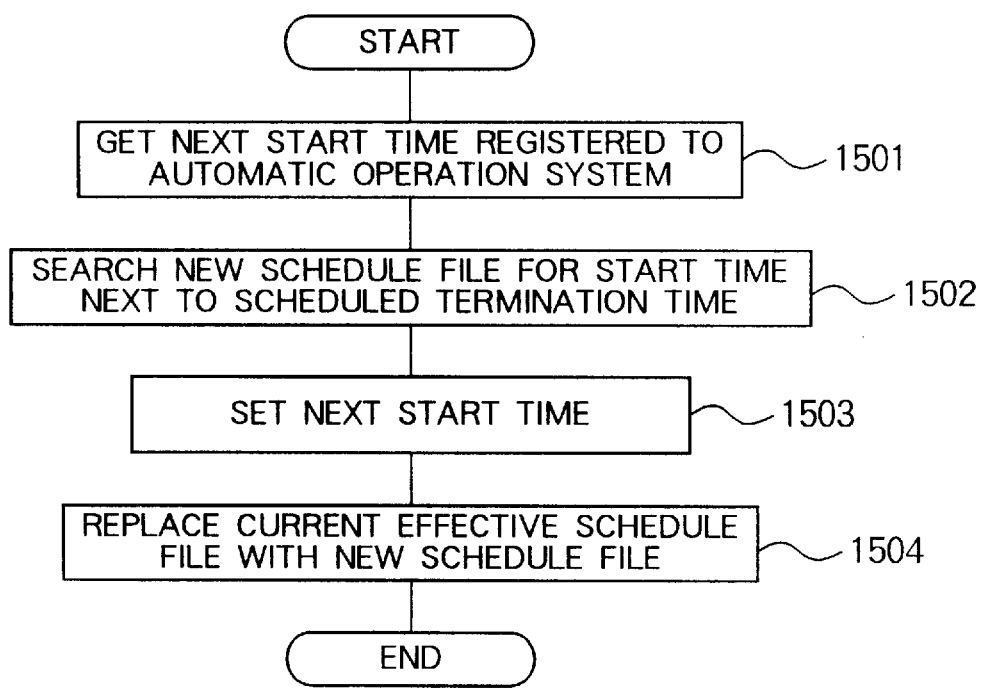
FIG. 16 is a flowchart showing a procedure of switching the schedule to start or terminate system in the embodiment according to the present invention.

FIG. 16 is a flowchart of operation to switch the schedule to start or terminate system achieved in step 706 of FIG. 8 by the schedule file switchers 110, 114, 117, 120, and 123 of the respective computers.

As shown in the processing flowchart, each of the switchers 110, 114, 117, 120, and 123 gets in step 1501 the next termination time registered to the automatic operation system 108, 112, 115, 118, or 121 corresponding to the associated computer. This operation can be accomplished, for example, by executing a command supported by the automatic operation system.

In step 1502, a search operation is carried out through the new schedule to obtain therefrom a start time which is next to the termination time attained in step 1501 and which is advanced in time with respect thereto. The next start time currently registered in the automatic operation system is then substituted for the obtained start time (step 1503). Finally, in step 1504, the current start or termination schedule of the automatic operation system is replaced by the new schedule. As a result, until the next chance of termination of the computer, the old start or termination schedule remains effective in the processing. Namely, when the terminated computer is again started, the new start or termination schedule is employed for the processing.

Figure 17:
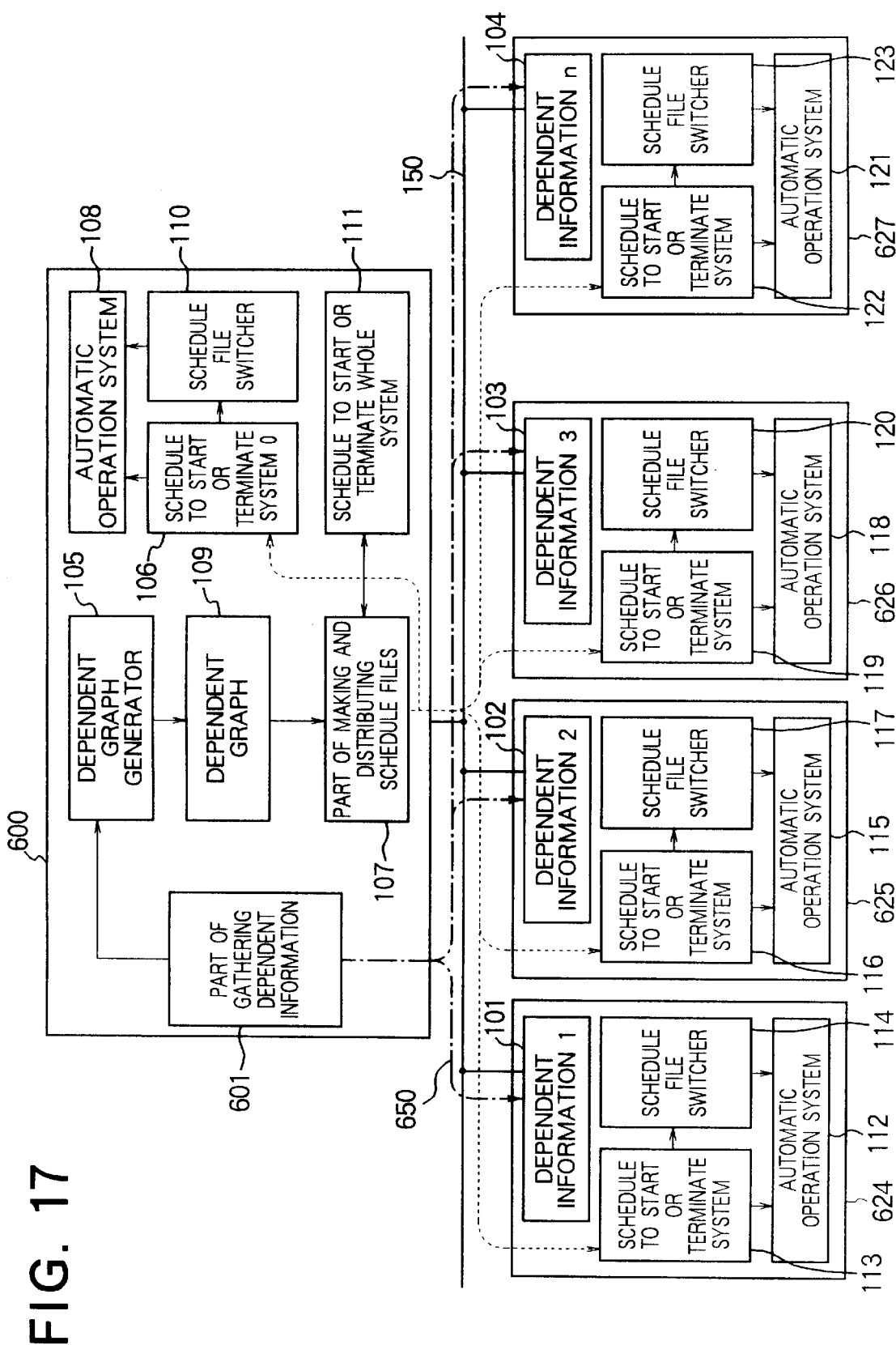
FIG. 17 is a block diagram showing another configuration of a portion related to automatic operation of the embodiment of the distributed system according to the present invention.

FIG. 17 shows constitution of a second embodiment of a distributed computer system according to the present invention. In the preceding embodiment in which the dependent information definition file of each computer is beforehand allocated in one computer as the center of automatic operation to generate the schedules. As compared therewith, the dependent information definition file is created and allocated in each computer in the second embodiment. In FIG. 17, reference numerals 600 and 624 to 627 denote computers. The computer 600 achieves the central function for automatic operation to generate and distribute automatic operation schedules. In FIG. 17, the functional mechanisms accomplishing the same functions as those of the preceding embodiment are assigned with the same reference numerals as those of FIG. 3. The second embodiment differs from the first embodiment in that the dependent information definition files 101 to 104 are distributively allocated to the respective computers and a part of gathering dependent information 601 is arranged in the computer 600. The information gathering part 601 collects via the network 150 the dependent information definition files 101 to 104 distributed to the respective computers and then passes the files 101 to 150 to the dependent graph generator 105. Dot-and-dash lines 650 indicate transfer paths of the dependent information definition files to the information gathering part 601. In this embodiment, the process of setting an automatic operation schedule can be achieved in a manner similar to that for the preceding embodiment excepting that the dependent information definition files 101 to 104 are collected in step 801 of FIG. 8 or in a process prior thereto by the part of gathering dependent information 601. In consequence, description of details thereof will be avoided.

In the embodiment described above, the processing procedures of the creation, distribution, and operation of the automatic operation schedule are carried out without intervention of the user. However, there may be employed user intervention during the processing to more flexibly set the automatic operation schedule. For example, input/output facilities such as a display and a pointing device are connected to the computer 100 in the configuration of FIG. 3. Between steps 702 and 703 of FIG. 8, there is presented on the display as shown in FIG. 12 a dependent graph generated according to information obtained in step 702. The system then accepts alteration in the dependence as well as the degree of dependence from the user operating the pointing device. Specifically, to update a degree of dependence, the user picks by the pointing device such as a mouse an arrow mark designating an objective dependence and then inputs a new value for the degree of dependence. Moreover, to alter a computer related to an objective dependence, the user moves an arrow mark indicating the pertinent dependence by the pointing device. The dependent graph generator 105 updates, in response to the change in the dependence and degree thereof indicated by the user, the pointer and degree of dependence set to node information created in step 702. Thereafter, the generator 105 executes a process beginning at step 703 according to the updated node information, thereby creating an automatic operation schedule on which the intention of the user is reflected. Furthermore, only the presentation of the dependent graph will help the user to easily recognize relationships of dependence between the computers of the system.

Figure 18:
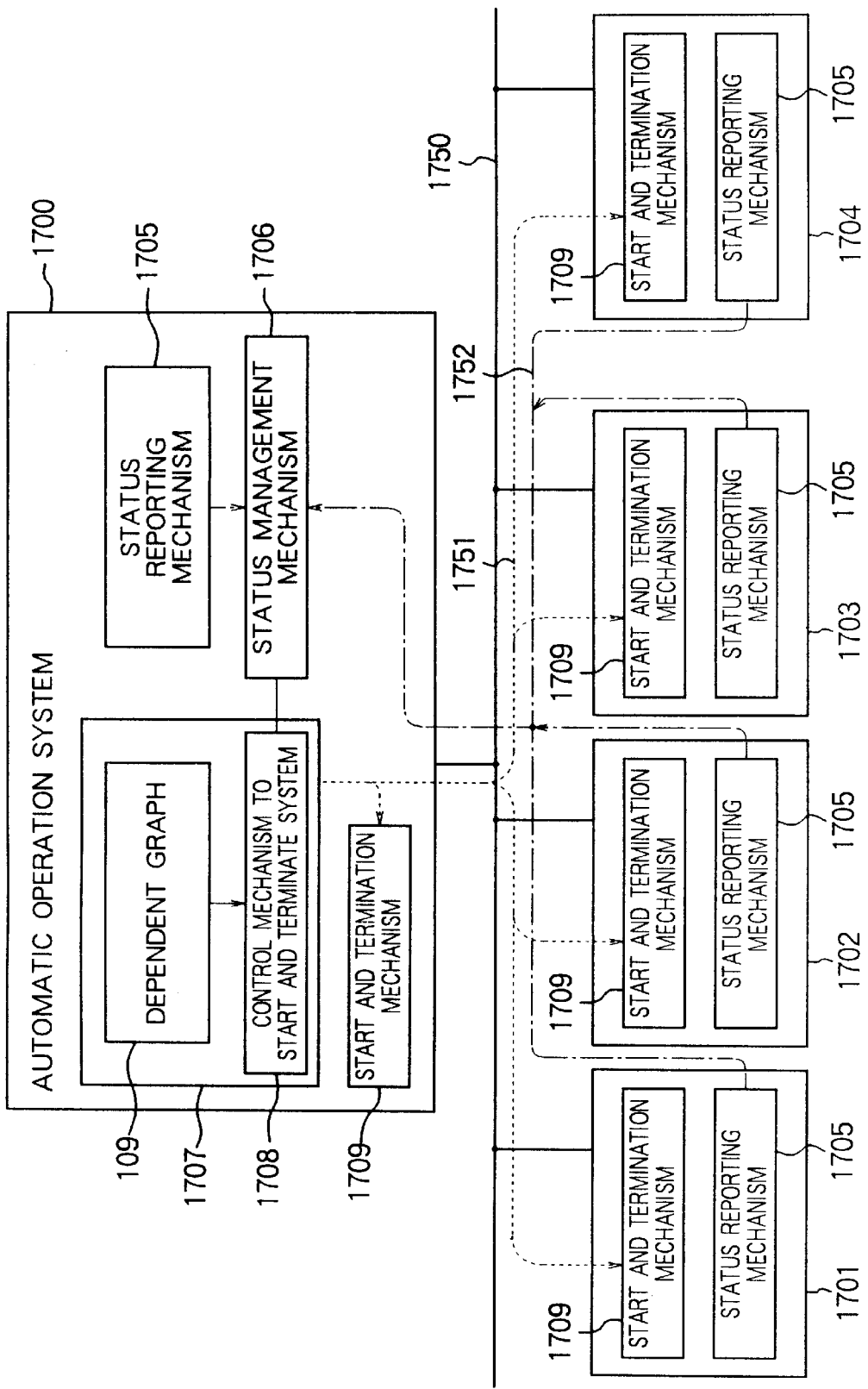
FIG. 18 is a block diagram showing further another configuration of a portion related to automatic operation of the embodiment of the distributed system according to the present invention.

FIG. 18 shows structure of an alternative embodiment of the distributed computer system to which the automatic operation control is applied according to the present invention. In this diagram, a reference numeral 1700 denotes a computer as the center of automatic operation. The computer 1700 corresponds to the computer 100 of FIG. 3. Numerals 1701 to 1704 designate other computers of the distributed computer system. The computers 1701 to 1704 correspond to the computers 124 to 127 of FIG. 3. The computers 1700 to 1704 are mutually connected to each other via a network 1750. The computer 1700 as the center of automatic operation includes an automatic operation system 1707 including a dependent graph 109 created as described in conjunction with the embodiments above and a control mechanism to start and terminate system 1708 and a status management mechanism 1706 for managing statuses of operations of the respective computers. Additionally, each of the computers 1700 to 1704 includes a status reporting mechanism 1705 and a start and termination mechanism 1709. The status reporting mechanism 1705 notifies the status of the associated computer to the status management mechanism 1700 of the computer 100. Operations to report computer statuses are indicated by dot-and-dash lines 1752 in FIG. 18. The status management mechanism 1706 manages the statuses of the respective computers according to the status reports sent from the respective status reporting mechanisms 1705. Each time the status of any one of the computers is changed, the status management mechanism 1706 reports the condition to the control mechanism to start and terminate system 1708. On receiving the report, according to a schedule beforehand registered in the system or according to an indication from the user for start or termination of particular computers, the mechanism 1708 instructs the respective start and termination mechanisms 1709 to start or terminate computers satisfying the start or termination condition. As the start or termination condition to be employed in this operation, there may be adopted the conditions set to the dependent information definition files described in conjunction with the preceding embodiments. Incidentally, the functional portion already described in relation to the production of the schedule is missing in FIG. 18.

In this embodiment, the start and termination of the computer are controlled as follows by the control mechanism 1708.

That is, to start a particular computer, the control mechanism 1708 conducts a search through the dependent graph for the computers on which the pertinent computer is dependent. If such computers are present, the mechanism 1708 instructs associated ones of the start and termination mechanisms 1709 and 1714 to 1717 to start the related computers in advance. As a result, according to the instructions from the mechanism 1708, the start and termination mechanisms starts the computers corresponding thereto. For example, assume that "HOST6" is desired to be started according to the dependent graph shown in FIG. 12. From the dependent graph, it is recognized that "HOST6" is dependent on five computers "HOST1" to "HOST5". Moreover, the sequence to start the computers is also decided according to the degrees of dependence in the dependent graph. Namely, the computers are initiated in the descending order of the accumulated value of degrees of dependence.

When terminating the computers, a search is carried out through the computers according to relationships of influence therebetween reverse to those described above so as to terminate the computers exerting influence at an earlier point of time. For example, to terminate "HOST6" in FIG. 12, it is known from the dependent graph that "HOST6" exerts influence upon three computers "HOST8", "HOST11", and "HOST10". Resultantly, the termination is instructed to the respective start and termination mechanisms 1709 to terminate the computers in the descending order of the accumulated value of degrees of dependence. In response to the instruction for termination, the respective start and termination mechanisms 1709 terminate the computers associated therewith. The operation for termination is achieved when the computer is in a state in which the computer can be terminated, for example, when the computer is not used by a user process or the like. The termination is reported from the status reporting mechanism 1705 to the status management mechanism 1706. According to the notification of termination notified to the status management mechanism 1706, the control mechanism to start and terminate system 1708 controls the sequence of terminating the computers.

According to the embodiment described above, in the creation of operation schedules for automatic operation in a distributed computer system, the overall system operation schedule can be configured only according to the relationships between each computer as an object of the schedule production and computers on which the computer is dependent. In consequence, the user need not consider the complicated relationships of dependence between the computers of the system and hence the dependence can be treated in a minimized form. Additionally, since the schedules are created on the basis of the dependence, the complex dependence between the computers in the distributed computer system can be appropriately reflected on each computer. Consequently, there is not required any mechanism to verify the generated schedules. Furthermore, the dependence can be clearly presented in the form of a dependent graph, which makes it easier to decide the design policy of distributing functions in the distributed computer system. In addition, since the sequence of starting or terminating computers can be instructed in consideration of the dependence, the distributed computer system can be operated in such a manner that only necessary ones of a multiplicity of computers are used. This improves usability of the system.

Although description has be given of schedules to control the start and termination of computers in the embodiments above, the present invention is also applicable to the control operations of any statuses other than those of the start and termination of computers.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. In a distributed computer system including a plurality of computers connected to each other via a communication path in which each computer executes processing by use of resources of the other computers, a method of generating schedule information defining a schedule of transferring a status of each computer to a particular status, comprising the steps of:

inputting to the system first information for each computer for which the schedule information is to be generated, the first information including description of relationships between each computer and other computers having resources to be used by each computer, the relationships being required to be satisfied when each computer is transferred to the particular status;

generating, according to the first information, second information corresponding to each computer for which the schedule information is to be generated, the second information including information linking each computer associated with the second information with other second information of the computers having the relationships; and generating for each computer for which the schedule information is to be generated, according to the second information, schedule information for transferring a status of each computer to a particular status, wherein the status of each computer corresponds to its operable/inoperable status, the relationships described in the first information being thereby satisfied for all computers for which the schedule information is to be generated thereby to generate the schedule for all of the plurality of computers.

2. A method of generating schedule information according to claim 1, wherein:

the first information includes information related to a day and time to be satisfied by the relationships;

the step of generating the second information includes generating the second information for each day and time specified by the information which is related to a day and time and which is included in the first information; and the step of generating the schedule information includes generating the schedule information for each day and time according to the second information generated for each day and time specified by the information related to a day and time.

3. A method of generating schedule information according to claim 1, wherein:

the transfer to the particular status is a transfer from an inoperable status of the computer to an operable status thereof; and the first information includes as an item of the relationships a period of time to be guaranteed as a time elapse from when another computer having resources being used by the computer corresponding to the first information is started to when the computer corresponding to the first information is stated.

4. A method of generating schedule information according to claim 1, wherein:

the transfer to the particular status is a transfer from an operating status of the computer to a termination status thereof; and the first information includes as an item of the relationships a period of time to be guaranteed as a time elapsed from when another computer having resources being used by the computer corresponding to the first information is terminated to when the computer corresponding to the first information is terminated.

5. A method of generating schedule information according to claim 1, wherein the first information includes as an item of the relationships information representing a status to which another computer having resources being used by the computer corresponding to the first information is to be set when the computer corresponding to the first information is transferred to the particular status.

6. A distributed computer processing system, comprising a plurality of computers and a communication path connecting the plural computers to each other, wherein at least one of the plural computers includes:

storage means for storing therein for each of the plural computers information of dependence indicating dependance to be satisfied between the computer and other computers having resources being used by the computer when the computer is transferred from a first status to a second status, wherein the first status corresponds to one of an operable/inoperable status of the computer and the second status corresponds to another one of the operable/inoperable status of the computer;

generating means for generating, according to the information of dependence stored in the storage means, node information corresponding to each of the plural computers, the node information including information establishing linkages to node information of the computers having the dependence on the computer;

generating means for generating, for each of the plural computers according to the node information, schedule information defining a schedule of transferring the status of the computer while satisfying the dependence; and distributing means for distributing the generated schedule information to the computers associated therewith, each of the plural computers including automatic operation means for transferring the status of the computer related thereto from the first status to the second status according to the schedule defined by the schedule information distributed from the distributing means.

7. A distributed computer processing system according to claim 6, wherein the computer further includes display means and means for displaying a graph on the display means according to the node information generated by the generating means, the graph including a plurality of graphic images respectively representing the plural computers and graphic images representing the dependence between the computers and establishing connections between the plural graphic images.

8. A distributed computer processing system according to claim 7, wherein the computer further includes means for accepting a change in the graph displayed on the display means and means for changing constituent elements of the node information according to the change accepted for the graph.

9. In a distributed computer system including a plurality of computers connected to each other via a communication path in which each computer executes processing by use of resources of the other, a method of generating schedule information defining a schedule of transferring a status of each computer from a first status to a second status, wherein the first status is one of an operable/inoperable status of each computer and the second status is another one of an operable/inoperable status of each computer, comprising the steps of:

gathering by one of the plural computers information of dependence for each of the plural computers, the information of dependence including description of relationships between the computer and the other computers, the relationships being required to be held when the computer is transferred from the first status to the second status;

generating, according to the information of dependence, a dependent graph representing overall dependence between the plural computers; and generating, according to the dependent graph, schedule information for each of the plural computers of transferring the status of the computer from the first status to the second status, the relationships described in the information of dependence being thereby held for the computers.

10. A method of generating schedule information according to claim 9, further including the steps of distributing the generated schedule information from the computer to each of the computers for which the schedule information is generated and transferring by each of the plural computers the status thereof from the first status to the second status according to the schedule information distributed thereto.

11. A method of generating schedule information according to claim 9, wherein the dependent graph generating step includes the step of generating, according to the information of dependence, node information corresponding to each of the plural computers and being used to constitute the dependent graph, the node information including information establishing linkages to node information of the computers having the dependence on the computer.

* * * * *